UNITED STATES PATENT OFFICE.

ROBERT E. SCHMIDT, OF ELBERFELD, GERMANY, ASSIGNOR TO THE FARBENFABRIKEN OF ELBERFELD COMPANY, OF NEW YORK, N. Y.

BLUE ANTHRARUFIN DYE AND PROCESS OF MAKING SAME.

SPECIFICATION forming part of Letters Patent No. 656,668, dated August 28, 1900.

Application filed August 15, 1899. Serial No. 727,257. (Specimens.)

*To all whom it may concern:*

Be it known that I, ROBERT E. SCHMIDT, doctor of philosophy, chemist, (assignor to the FARBENFABRIKEN OF ELBERFELD COMPANY, of New York,) residing at Elberfeld, Germany, have invented a new and useful Improvement in Dyes Derived from Anthrarufin; and I hereby declare the following to be a clear and exact description of my invention.

In the specification to Letters Patent No. 595,349 I have described the manufacture of a disulfonic acid of paradiamidoanthrarufin having the formula

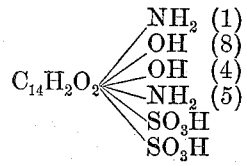

I have found that a valuable new benzylated dyestuff can be obtained by subjecting the said disulfonic acid to the action of benzyl chlorid.

In carrying out my new process practically I can proceed as follows, (the parts being by weight:) Eight parts of benzyl chlorid are slowly introduced, with energetic stirring, into a solution prepared from ten parts of diamidoanthrarufindisulfonic acid and five hundred parts of hot water, the temperature of the solution being kept at about from 80° to 90° centigrade. Stirring is continued at the same temperature until a test portion when dissolved in concentrated sulfuric acid and mixed with boric acid is found to exhibit no longer the characteristic absorption spectrum of the boric-acid ether of the diamidoanthrarufindisulfonic acid. When this stage is reached, the new benzylated dyestuff (which begins to separate partially from the reaction mixture even when still hot) is completely precipitated by cooling the reaction mixture and by the addition of a concentrated common-salt solution. The coloring-matter is finally filtered off, dried, and pulverized. It is thus obtained in the shape of a blue powder.

The dyestuff is soluble in water with a blue color, which is more greenish blue than that of a watery solution of the diamidoanthrarufindisulfonic acid. On adding strong hydrochloric acid to the watery solution of the new dyestuff the latter is precipitated, the color of the solution not being changed into violet.

The new benzylated dyestuff is easily soluble in alcohol. By concentrated sulfuric acid it is dissolved with a yellow color, which changes into green on the addition of boric acid.

The new dyestuff dyes unmordanted wool in acid-baths bright-blue shades and yields on chrome-mordanted wool greenish-blue shades.

Having now described my invention and in what manner the same is to be performed, what I claim as new, and desire to secure by Letters Patent, is—

1. The process for producing a new benzylated derivative from diamidoanthrarufindisulfonic acid which process consists in first heating a mixture prepared from a watery solution of diamidoanthrarufindisulfonic acid and benzyl chlorid, secondly precipitating the new dyestuff from the reaction mixture and finally isolating the same, substantially as hereinbefore described.

2. As a new article of manufacture the new benzylated anthrarufin dyestuff being when dry and pulverized a blue powder soluble in water with a blue color from which solution on the addition of strong hydrochloric acid the dyestuff is precipitated the color of the solution being, however, not changed into violet, easily soluble in alcohol, being dissolved by concentrated sulfuric acid with a yellow color which is changed into green on the addition of boric acid, dyeing unmordanted wool bright-blue shades, yielding on chrome-mordanted wool greenish-blue shades, substantially as hereinbefore described.

In testimony whereof I have signed my name in the presence of two subscribing witnesses.

ROBERT E. SCHMIDT.

Witnesses:
R. E. JAHN,
OTTO KÖNIG.